Nov. 1, 1938.                J. G. JACKSON                2,135,341
                              PAN SET STAY
                         Filed Feb. 23, 1937           2 Sheets-Sheet 1
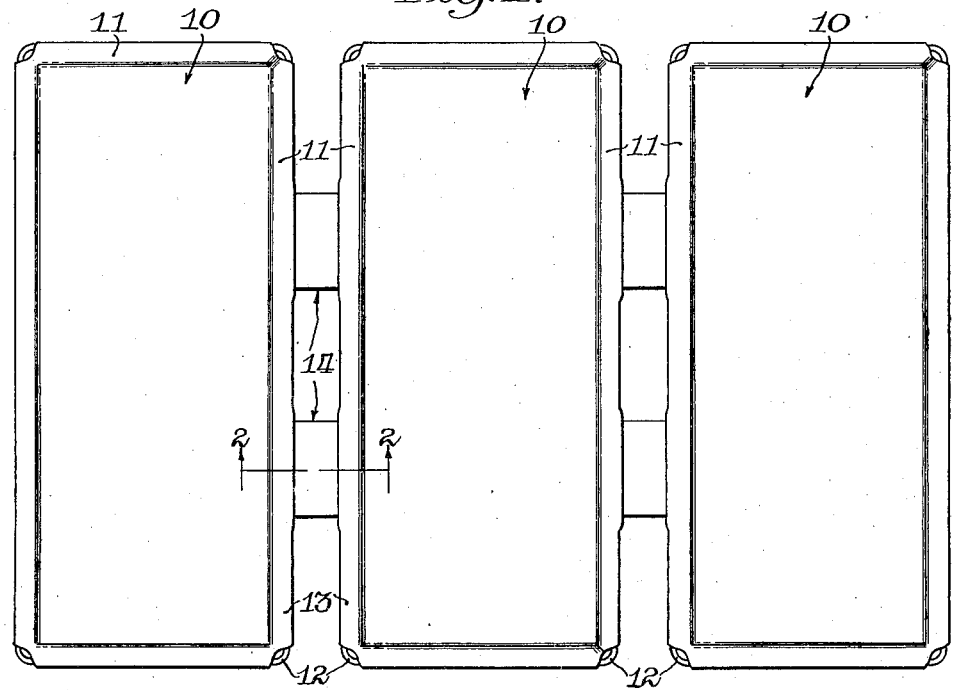
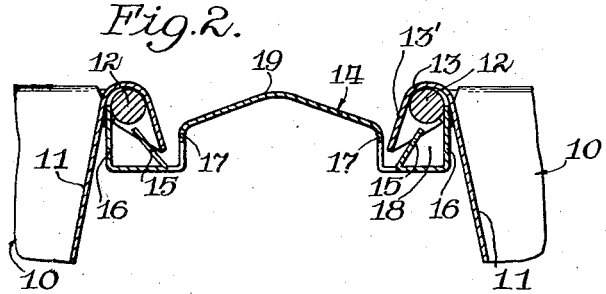
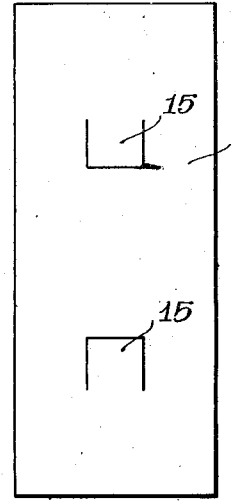
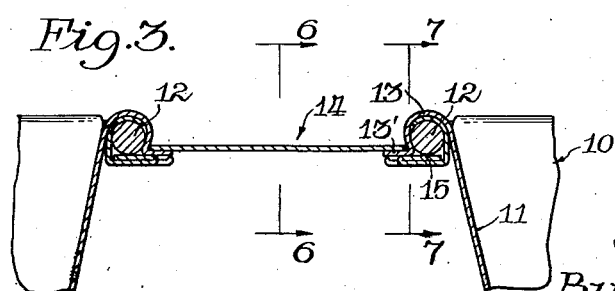
Inventor
Joseph G. Jackson
By Stanley Hoods
      Atty.

Nov. 1, 1938.   J. G. JACKSON   2,135,341
PAN SET STAY
Filed Feb. 23, 1937   2 Sheets-Sheet 2
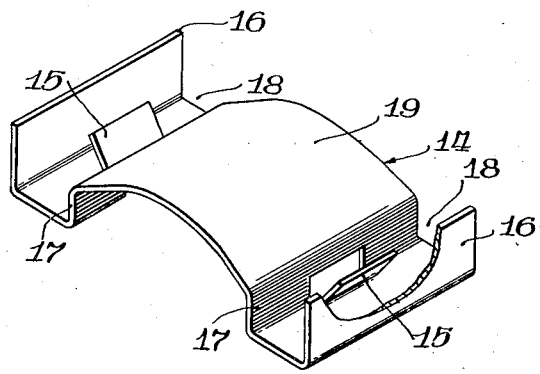
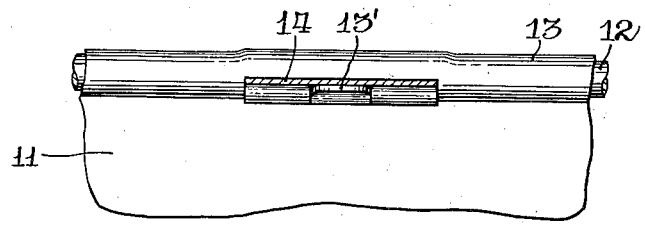
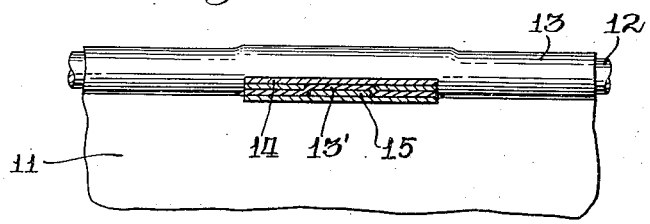
Inventor
Joseph G. Jackson.
By Stanley Hoods
Atty.

Patented Nov. 1, 1938

2,135,341

UNITED STATES PATENT OFFICE 2,135,341

PAN SET STAY

Joseph G. Jackson, Oak Park, Ill., assignor to The Edward Katzinger Company, Chicago, Ill., a corporation of Illinois Application February 23, 1937, Serial No. 127,330

13 Claims. (Cl. 53—6)

This invention relates to pan set stays and has for its object the provision of a stay between the adjoining walls of adjacent pans of a set which will have a rigid and permanent connection with the pan walls, be incapable of slipping or moving longitudinally of the pans, and greatly increase the strength and durability of the pan set generally and the inner parallel walls of the pans thereof particularly.

With the above and other objects in view, as will be apparent, this invention consists in the construction, combination and arrangement of parts, all as hereinafter more fully described, claimed and illustrated in the accompanying drawings, wherein:

Fig. 1 is a fragmentary plan view of the adjoining walls of adjacent pans of a pan set illustrating the present invention cooperating therewith;

Fig. 2 is a transverse section through the pan walls taken along line 2—2 of Fig. 1 and shows a stage in the assembly of the set, the mounting of the stay and the relative positions of the several elements of the structure prior to the completion of the assembly;

Fig. 3 is a view similar to Fig. 2 illustrating the relative positions of the elements of the structure subsequent to the completion of the assembly;

Fig. 4 is a plan view of the blank from which the stay is formed;

Fig. 5 is a perspective view of the stay after it is formed but prior to its being positioned in its operative position coacting with the adjoining walls of adjacent pans of the set;

Fig. 6 is a section taken transversely through the stay along line 6—6 of Fig. 3 illustrating the completed assembly and the coaction of the stay with the bead on a pan wall; and Fig. 7 is a vertical section taken along line 7—7 of Fig. 3 to disclose the cooperation of the stay with the bead and flange on the wall of a pan of a set.

Pan sets of different forms and constructions are quite well known in the art and generally consist of a plurality of individual baking pans secured together in spaced, parallel relationship. These individual pans are incorporated into a set and held there in their spaced relative positions by any suitable means, usually a frame formed of straps surrounding the pans of the set and resting flush against the exposed walls of the individual pans thereof and secured thereto by any one of a number of means. Since the foregoing construction, i. e., the form and style of the pans, the means of securing them together and the mounting thereof forms no part of the present invention it is neither shown nor described herein.

It has been found to be desirable to interpose stays or braces between the adjoining walls of the adjacent pans of the set, approximately centrally of the length of such walls, to strengthen them and to overcome any tendency thereof to bulge outwardly under the pressure of the contents of the individual pans, and to generally strengthen the set and the individual pans.

Inasmuch as the individual pans of the set are provided with outstanding or projecting beads at the edges of the walls thereof, it is customary to secure and mount the stays or braces in connection with said beads. Prior hereto the braces or stays coacting with and interposed between the beads of the adjoining walls of adjacent pans of a set, have been difficult to mount or attach, often become disengaged or free from the beads, and not infrequently, upon loosening, have a tendency to move longitudinally of the beads, and pan walls away from their initial and most advantageous position with reference to the pan walls.

The present invention contemplates a brace or stay easily positioned or interposed between the adjoining walls of adjacent pans of the set, incapable of being disengaged or freed from the beads on said walls, and when once fixed or set in position does not become loosened and have a tendency to move longitudinally of the beads and pan walls. These and many other advantages are attained by the present invention which also strengthens the pan set generally and especially the adjoining parallel walls of the pans thereof.

Reference being had more particularly to the drawings, 10 designates the individual baking pans of a pan set. These pans 10 may be of any shape, style or formation and be secured one to the other in spaced parallel relative positions by any means or in any manner. The walls 11 of each individual pan 10 are surrounded by a wire frame 12 adjacent to the edges thereof and integral flanges 13 are provided at the walls 11 to be bent outwardly, downwardly and inwardly about the frame 12 thereby creating outstanding beads at the edges of the pan walls 11. The formation of the outstanding beads at the edges of the pan walls 11 may be accomplished by a number of means and in several ways, that here shown and described being one commonly employed.

The stay forming the subject matter of the present invention initially comprises a rectangular flat section or plate of metal 14 as shown in Fig. 4. A pair of inwardly extending ears or tongues 15 are cut away from the plate 14 centrally of the length thereof, one ear or tongue 15 adjoining each longitudinal edge of said plate 14. This plate 14 is formed or shaped as illustrated in Fig. 5. Its longitudinal edges are bent to rest parallel one to the other and at approximate right angles to the plate 14 thereby producing a right angularly disposed outer flange 16 at each edge of said plate. The ears or tongues 15 are similarly positioned and hence may be substantially parallel to the flanges 16 but spaced therefrom. At the lines of the bases of the tongues 15 where they are integral with the body of the plate 14, the latter is bent substantially at right angles thereby producing the inner flanges 17 lying parallel to the outer flanges 16 and with them creating the channels or grooves 18 at the sides of the plate 14. Medially of its width between the channels or grooves 18, the body of the plate 14 is bent slightly, as at 19, and slopes toward the inner sides of said channels or grooves 18, i. e. the inner flanges 17. It is to be noted from Fig. 2 that each of the ears or tongues 15 occupies a position at an acute angle to the base of its channel 18 and to the adjacent inner flange 17, prior to being affixed between the beads at the edges of the adjoining walls 11 of adjacent pans 10 of the set.

Upon the assembly of the individual pans 10 into a set, the flanges 13 on at least the adjoining walls 11 of adjacent pans, are not wrapped about the frame 12 until the stay has been set in place, but rest substantially vertical as shown in Fig. 2. The set is then inverted and a stay interposed between the adjoining walls 11 of adjacent pans 10, with the edges of the outer flanges 16 in and bearing against the junctions between the walls 11 and the wire frames 12 of the respective pans 10 and the edge portions 13' of the flanges 13 of said pans resting vertically and disposed between the ears or tongues 15 and the inner flanges 17 of the stay. Thereupon the application of uniform pressure to the stay at all points forces the outer flanges 16 of the stay between the flanges 13 on the edges of the walls 11 of the pans 10, causing them to follow the cross-sectional shape and contour of the frame for a considerable distance and be firmly and fixedly gripped and engaged between said flanges 13 and frame 12. Simultaneously the body 14 of the stay straightens causing the inner flanges 17 of the stay to bend upon themselves to rest flush one on the other and against the under surface of the stay and at the same time the edge portions 13' of the flanges 13 on the walls 11 of the pans 10 bend outwardly to be seated and engaged between the rebent sections of the inner flanges 17. While this arrangement of the parts is taking place the tongues 15 may be forced upwardly between the edge portions 13' of the flanges 13 and the wire frame 12 or they may bend to rest flush against the inner faces of the base parts of the channels or grooves 18 extending between the flanges 16 and 17 defining the channels.

This positioning and arrangement of the elements and the pressure by which it is accomplished causes the flanges 13 or the edge portions 13' thereof to bend to engage the ears or tongues 15 on each side thereof, thereby alone and/or in combination with the other features of the structure, preventing any movement of the stay longitudinally of the beads and the walls 11. Any strain on the exposed face of the stay, such as when a set of pans is being nested with another and the stay of one set is struck on its face by the corner or edge of another set, will be effective to favor the firm engagement of the seated portion of the stay between the pan flange 13 and the wire 12. This result is accomplished by virtue of the fact that the pressure with which the pan flange 13 bears on the seated portion of the stay is increased by a downward force at the edge portions 13' of the flange 13.

From the foregoing it is evident that the present brace or stay construction very materially strengthens the individual pans, cannot become loosened or disengaged from their cooperating beads, and will be incapable of any movement longitudinally of the cooperating pans or the beads thereon.

What is claimed is:

1. The combination with a pair of baking pans, each surrounded by a wire frame and having flanges at the edges of the walls thereof to be wrapped around said wire frame, of a stay interposed between said pans, outer flanges on said stay seated between said wire frame and the flanges on the pan walls, inner flanges on said stay rebent upon themselves to grip and engage the pan flanges aforesaid, and tongues formed on said stay to be engaged by the said pan flanges.

2. The combination with a pair of baking pans, each surrounded by a wire frame and having flanges at the edges of the walls thereof to be wrapped around said wire frame, of a stay interposed between said pans, outer flanges on said stay seated between said wire frame and the flanges on the pan walls, inner flanges on said stay rebent upon themselves to grip and engage the pan flanges aforesaid, and tongues formed from said stay and positioned between the flanges of the stay to cause the coacting pan flanges to be bent angularly upon each side thereof.

3. The combination with a pair of baking pans, each having a wire lying against the adjoining walls thereof and flanges on said walls to be wrapped about said wires, of a stay interposed between said pans, spaced parallel flanges at each end of said stay combining to form a channel for the reception of one of said wires, one of said flanges being engaged and gripped between a wire and the coacting pan flange and the other being bent upon itself to receive and grip the edge portion of a pan flange, and tongues formed from the stay and lying within the channels at the ends of the stay whereby the pan flanges are bent angularly on each side thereof.

4. The combination with a pair of baking pans, each surrounded by a wire frame and having flanges at the edges of the walls thereof wrapped about the wire of said frame, of a stay interposed between the adjoining walls of adjacent pans comprising a relatively flat plate, spaced inner and outer flanges at each end of said plate, combining to form channels to cooperate with the wire frames of adjacent pans, the outer of said flanges being bent about the wire frames of the pans to contact major portions thereof and be gripped between the pan flanges and said frames, and the inner flanges being rebent to receive and engage the edge portions of the pan flanges projecting between the rebent sections thereof, and tongues formed from the plate and lying in the channels aforesaid.

5. The combination with a pair of baking pans, each surrounded by a wire frame and having flanges at the edges of the walls thereof wrapped about the wire of said frame, of a stay interposed between the adjoining walls of adjacent pans comprising a relatively flat plate, spaced inner and outer flanges at each end of said plate combining to form channels to cooperate with the wire frames of adjacent pans, the outer of said flanges being bent about the wire frames of the pans to contact major portions thereof and be gripped between the pan flanges and said frames, and the inner flanges being rebent to create parallel sections lying substantially parallel to the plate between which outwardly bent edge portions of the pan flanges are received and gripped.

6. The combination with a pair of baking pans, each surrounded by a wire frame and having flanges at the edges of the walls thereof wrapped about the wire of said frame, of a stay interposed between the adjoining walls of adjacent pans comprising a relatively flat plate, spaced inner and outer flanges at each end of said plate combining to form channels to cooperate with the wire frames of adjacent pans, the outer of said flanges being bent about the wire frames of the pans to contact major portions thereof and be gripped between the pan flanges and said frames, and the inner flanges being rebent to create parallel sections lying substantially parallel to the plate between which outwardly bent edge portions of the pan flanges are received and gripped, and tongues formed from the plate and positioned in the channels aforesaid.

7. The combination with a pair of baking pans, each surrounded by a wire frame and having flanges at the edges of the walls thereof wrapped about the wire of said frame, of a stay interposed between the adjoining walls of adjacent pans comprising a relatively flat plate, spaced inner and outer flanges at each end of said plate combining to form channels to cooperate with the wire frames of adjacent pans, the outer of said flanges being bent about the wire frames of the pans to contact major portions thereof and be gripped between the pan flanges and said frames, and the inner flanges being rebent to create parallel sections lying substantially parallel to the plate between which outwardly bent edge portions of the pan flanges are received and gripped, and tongues formed from the plate and positioned in the channels between said inner and outer flanges, the outwardly bent edge portions of the pan flanges overlying said tongues.

8. The combination with a pair of baking pans, each surrounded by a wire frame and having flanges at the edges of the walls thereof wrapped about the wire of said frame, of a stay interposed between the adjoining walls of adjacent pans comprising a relatively flat plate, spaced inner and outer flanges at each end of said plate combining to form channels to cooperate with the wire frames of adjacent pans, the outer of said flanges being bent about the wire frames of the pans to contact the major portions thereof and be gripped between the pan flanges and said frames, and the inner flanges being rebent to create parallel sections lying substantially parallel to the plate between which outwardly bent edge portions of the pan flanges are received and gripped, and tongues formed from the plate and positioned in the channels between said inner and outer flanges, the outwardly bent edge portions of the pan flanges overlying said tongues angularly bent on each side of said tongues.

9. The combination with a pair of spaced baking pans, each exteriorly surrounded by a wire frame resting flush against the walls thereof and provided at the edges of its walls with flanges wrapped about said frame, of a stay interposed between said pans, consisting of a relatively flat plate, inner and outer flanges disposed angularly to each end of said plate creating channels to cooperate with the wire frames of said pans, the outer of said flanges being partially wrapped about said frame and positioned between the pan flanges and the wire frames and the inner of said flanges being rebent to form parallel sections lying adjacent each other and against the plate and receiving and engaging therebetween outwardly bent edge portions of the pan flanges, and tongues formed from said plate and positioned in the channels aforesaid, the outwardly bent edge portions of the pan flanges overlying said tongues to be angularly bent upon each side thereof.

10. The combination with a pair of spaced baking pans, each exteriorly surrounded by a wire frame resting flush against the walls thereof and provided at the edges of its walls with flanges wrapped about said frame, of a stay interposed between said pans, consisting of a relatively flat plate, inner and outer flanges disposed angularly to each end of said plate creating channels to cooperate with the wire frames of said pans, the outer of said flanges being partially wrapped about said frame and positioned between the pan flanges and the wire frames and the inner of said flanges being rebent to form parallel sections lying adjacent each other and against the plate and receiving and engaging therebetween outwardly bent edge portions of the pan flanges, and tongues formed from said plate and positioned in the channels aforesaid, the outwardly bent edge portions of the pan flanges overlying said tongues to be angularly bent thereby upon each side thereof.

11. The combination with a pair of spaced baking pans, each having its walls bent to form outstanding beads at the edges thereof, of a stay interposed between the adjoining beads of said pans, a portion of said stay being rebent to form parallel sections lying adjacent each other and against the body of said stay and receiving and engaging therebetween portions of said beads, and upwardly bent end portions of said stay seated within the beads aforesaid.

12. The combination with a pair of spaced baking pans, each having a reinforcing member lying against the adjoining walls thereof and having flanges at the edges of the walls thereof wrapped about said reinforcing member, of a stay interposed between said pans, flanges on said stay seated between said reinforcing member and the flanges on the pan walls, and means including an independent connection between said stay and said flanges at the edges of the walls of the pans whereby portions of said stay exposed to strains normally tending to unseat said stay are adapted to render said strains favorable to the maintenance of said seated condition.

13. The combination with a pair of spaced baking pans, of a stay interposed between said pans, a connection between each end of said stay and the pan adjacent thereto, and means including an independent connection spaced inwardly of the ends of said stay and the pan adjacent thereto whereby portions of said stay exposed to strains normally tending to unseat said stay are adapted to render said strains favorable to the maintenance of the connection between each end of said stay and the pan adjacent thereto.

JOSEPH G. JACKSON.